Dec. 8, 1970           H. O. SCHERENBERG           3,545,299
SAFETY STEERING DEVICE FOR MOTOR VEHICLES
Filed July 29, 1968
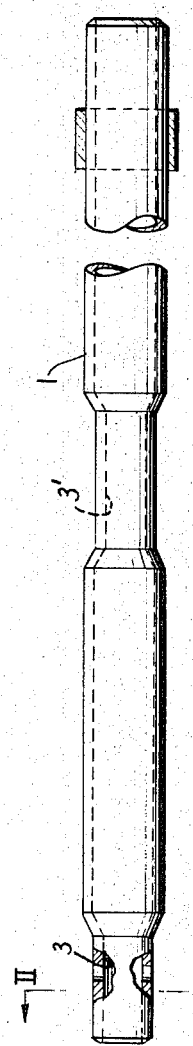
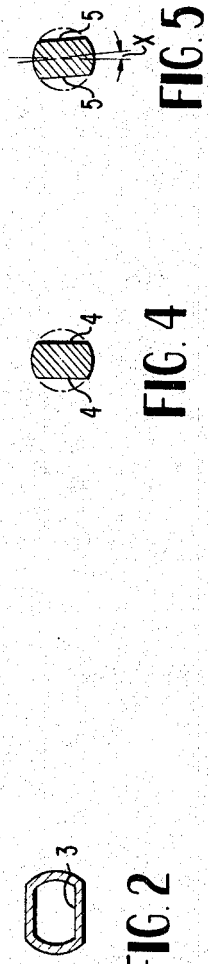
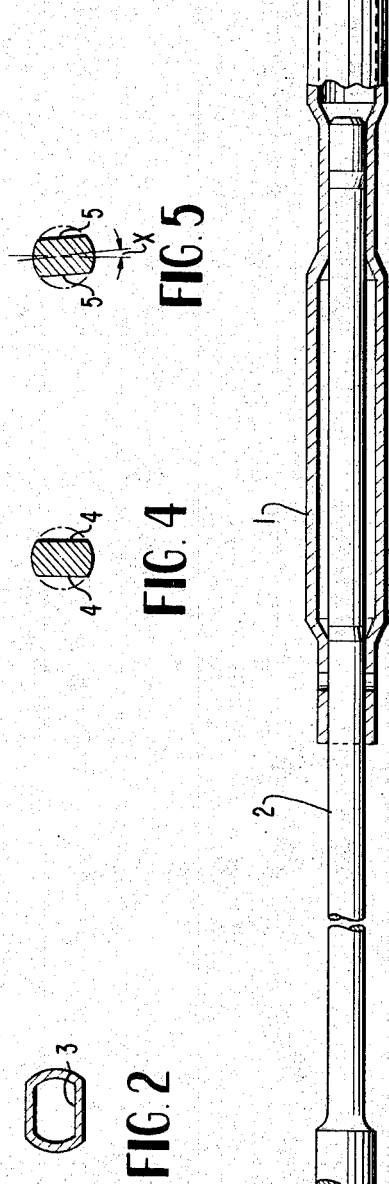
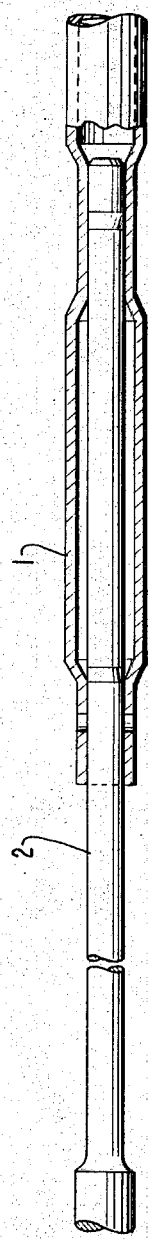
*INVENTOR*
HANS O. SCHERENBERG
BY *Craig & Antonelli*
ATTORNEYS

United States Patent Office 3,545,299
Patented Dec. 8, 1970

3,545,299
SAFETY STEERING DEVICE FOR MOTOR VEHICLES
Hans O. Scherenberg, Stuttgart-Heumaden, Germany, assignor to Daimler-Benz Aktiengesellschaft, Stuttgart-Unterturkheim, Germany
Filed July 29, 1968, Ser. No. 748,386
Claims priority, application Germany, July 29, 1967, 1,630,326
Int. Cl. B62d 1/18
U.S. Cl. 74—492         2 Claims

ABSTRACT OF THE DISCLOSURE

A safety steering device for motor vehicles in which the steering spindle consists of two parts adapted to telescope one into the other whereby, for purposes of achieving a play-free entrainment in the circumferential direction, these parts are mutually stressed in the circumferential direction.

BACKGROUND OF THE INVENTION

The present invention relates to a safety steering device for motor vehicles whose steering spindle includes parts adapted to slide telescopically one into the other, whereby these parts, for example, a steering spindle tube and a steering spindle slide member are so arranged one within the other that a play-free entrainment in the circumferential direction is assured.

Steering devices whose steering spindle includes parts telescopically sliding into one another are known, per se, in the prior art. It is achieved by such a construction of the steering spindle that in case of a shortening of the front section of a motor vehicle caused by accidents, the steering spindle cannot be pressed or pushed into the interior space of the vehicle.

However, with such types of steering devices, the selection of the fit of the parts of the steering spindle telescoped one into the other involved difficulties heretofore. This is so as, on the one hand, a practically play-free entrainment in the circumferential direction has to be insisted upon in order not to impair the accuracy of the steering and, on the other it must be assured that also after the operation of the vehicle over a period of many years, the telescoping displaceability of the corresponding parts with respect to each other remains preserved to the full extent.

SUMMARY OF THE INVENTION

In order to fulfill these requirements, there is proposed a safety steering arrangement for motor vehicles, whose steering spindle includes parts adapted to telescope one into the other, whereby, according to the present invention, these parts, for example, a steering spindle tube and a steering spindle sliding member are mutually stressed in the circumferential direction for achieving a play-free entrainment in the circumferential direction.

According to one advantageous construction of the present invention, this stressing is achieved in that the steering spindle tube is twisted prior to assembly by a predetermined angle about its center longitudinal axis.

However, it is also possible to manufacture beforehand the guide surfaces at the steering spindle tube and/or at the steering spindle sliding member mutually offset by a predetermined angle about their center longitudinal axis.

Accordingly, it is an object of the present invention to provide a safety steering device for motor vehicles which obviates by simple means the aforementioned shortcomings and drawbacks encountered in the prior art.

Another object of the present invention resides in a safety steering arrangement for motor vehicles in which a practically play-free entrainment in the circumferential direction is assured together with the preservation of the mutual displaceability of the telescoping parts regardless of the length of time the motor vehicle has been operated.

These and further objects, features, and advantages of the present invention will become more obvious from the following description when taken in connection with the accompanying drawing which shows, for purposes of illustration only, one embodiment in accordance with the present invention, and wherein:

FIG. 1 is a side elevational view of a steering spindle tube according to the present invention;

FIG. 2 is a cross-sectional view taken along line II—II of FIG. 1;

FIG. 3 is a side elevational view of a steering spindle sliding member according to the present invention;

FIG. 4 is a cross-sectional view taken along line IV—IV of FIG. 3;

FIG. 5 is a cross-sectional view taken along line V—V of FIG. 3; and

FIG. 6 is an elevational view, partly in cross section, of the steering spindle tube and of the steering spindle sliding member according to the present invention in the assembled condition thereof.

Referring now to the drawing wherein like reference numerals are used throughout the various views to designate like parts, the steering spindle tube 1 and the steering spindle sliding member 2 each are provided with guide surface 3, 3' and 4, 5, respectively, which serve for the guidance and entrainment of these structural parts in the circumferential direction.

As can be seen from FIGS. 4 and 5 of the drawing, the guide surfaces 4 and 5 of the steering spindle sliding member 2 are mutually rotated by an angle X about the center longitudinal axis thereof so that after assembly under stress they abut under prestress against the corresponding guide surfaces 3 of the steering spindle tube 1 whereby a play-free guidance and entrainment in the circumferential direction is assured.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. A safety steering device for motor vehicles comprising a steering spindle having one part constituting a steering spindle tube and another part constituting a steering spindle sliding member telescopically slidable within the steering spindle tube, characterized in that longitudinally spaced guide surfaces are provided at one of said parts, said spaced guide surfaces being mutually offset by a predetermined angle about the center longitudinal axis, and substantially aligned and longitudinally spaced guide surfaces are provided at the other of said parts for substantially mating with said first-mentioned guide surfaces, whereby said steering spindle tube and said steering spindle sliding member are mutually stressed in the circumferential direction for attaining a play-free entrainment.

2. A safety steering device according to claim 1, wherein the offset of the guide surface is at the steering spindle sliding member and is formed by the steering spindle sliding member being twister prior to assembly.

References Cited

UNITED STATES PATENTS

| 1,803,995 | 5/1931 | Chilton | 287—53 |
| 3,222,772 | 12/1965 | Leyner | 287—53X |
| 3,318,170 | 5/1967 | Runkle | 74—493 |
| 3,369,425 | 2/1968 | Runkle et al. | 74—493 |

MILTON KAUFMAN, Primary Examiner

U.S. Cl. X.R.

287—53